United States Patent Office 3,169,662
Patented Feb. 16, 1965

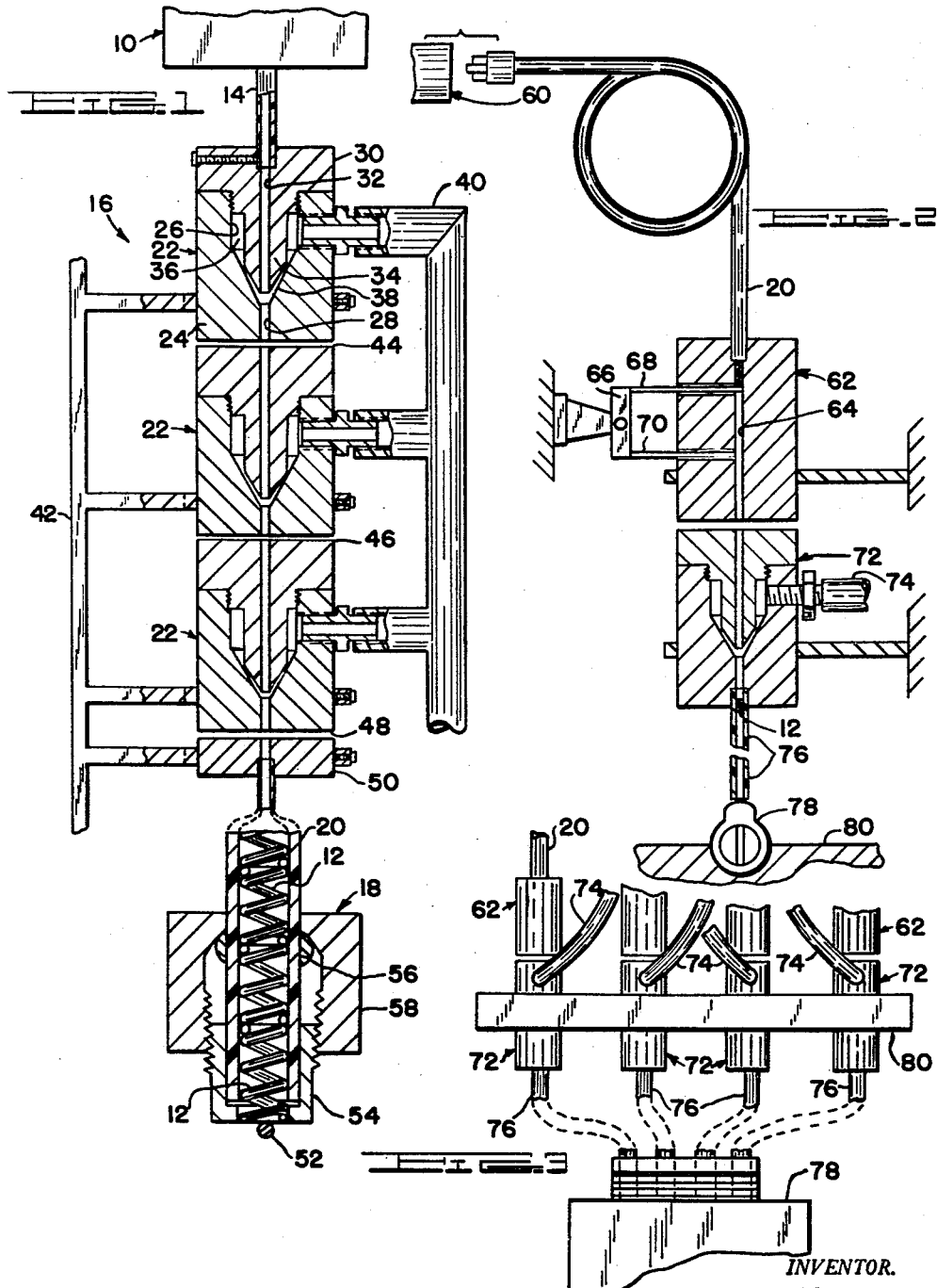

3,169,662
APPARATUS FOR HANDLING SMALL ARTICLES
Leo Goran, Jr., Madison Heights, Mich., assignor to Avis Industrial Corporation, Almont, Mich., a corporation of Delaware
Application May 26, 1960, Ser. No. 31,953, now Patent No. 3,063,213, dated Nov. 13, 1962, which is a division of application Ser. No. 828,143, July 20, 1959. Divided and this application July 27, 1962, Ser. No. 212,905
2 Claims. (Cl. 221—236)

The present invention relates to apparatus for receiving small coil springs and similar articles from a coil spring forming or dispensing machine for storage, transportation or subsequent assembly operations, and for introducing such articles automatically into products requiring their presence. This application is a division of application Serial Number 31,953, filed May 26, 1960, now Patent No. 3,063,213 and the latter application is a division of application Serial Number 828,143, filed July 20, 1959.

In the manufacture of such products as coil springs, the normal procedure is to deposit the newly formed coil springs in containers where they generally become interlocked causing subsequent difficulty in disengaging them. In production operations, workers are then required to disengage the coil springs and feed them singly to workpieces where the springs are required. This is particularly true in the manufacture of such products as locks of the type having key plugs wherein coil springs are used in chambers housing the plurality of lock pins.

The present invention provides apparatus to overcome the handling and storage problems that exist in connection with prior methods of forming and using coil springs and the like, and provides apparatus whereby the coil springs are assembled in aligned positions in flexible containers for transportation, storage and subsequent feeding operations, thereby substantially reducing handling operations in connection with the springs. The present invention also provides apparatus for receiving and feeding coil springs and the like into a relatively long flexible tube adapted to have its ends closed for retaining coil springs loaded thereinto.

It is an object of the present invention to provide apparatus for unloading coil springs singly from a relatively long flexible tubing of the foregoing character into which the coil springs have been inserted.

It is still another object of the present invention to provide apparatus for removing coil springs and the like singly and in sequence from said flexible tubing and conveying each such coil spring in proper alignment to a product for insertion thereinto.

Other objects of this invention will appear in the following description and appended claims, reference being had to the accompanying drawings forming a part of this specification wherein like reference characters designate corresponding parts in the several views.

In the drawings:

FIGURE 1 is a schematic view partially in section with portions enlarged for illustration purposes showing apparatus for receiving and inserting coil springs in alignment into a flexible plastic tube;

FIGURE 2 is another schematic view partially in section with portions enlarged illustrating apparatus for carrying out steps of operation in unloading coil springs from a flexible plastic tube and inserting one of such coil springs into a key plug adapted to utilize such springs; and FIGURE 3 is another schematic view illustrating a plurality of the unloading apparatus of FIGURE 2 arranged to simultaneously insert coil springs into each of the coil spring compartments in a conventional key plug.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. Attention is directed first to FIGURE 1 in connection with which the apparatus for loading coil springs into a flexible plastic tube will be described. A machine 10 which either forms or dispenses coil springs 12 has a discharge duct 14 to which is connected the inlet end of an air propelling device 16. Connected to the outlet end of the air propelling device 16 is a flexible plastic tube assembly 18 wherein the tube 20 has an internal diameter slightly larger than the external diameter of the coil springs 12 and is normally left in a coiled position during a loading operation.

The air propelling device 16 has a series of impeller units 22, three being shown, which are coaxially aligned and are constructed substantially the same. Therefore, only the first of the series of impeller units 22 will be described in detail, and it will be understood that the remaining impeller units are similarly constructed and arranged. The number of such impeller units that are required depends upon the impedance of air flow through the tube 20, which will vary depending upon such factors as the dimensions and the physical properties of the tube 20, the impedance of air flow created by the coil springs, and the like.

The first impeller unit 22 has a body portion 24 with a hollow bore 26 which converges at its lower end to the outlet duct 28. Threadedly connected to the body portion 24 is a cap portion 30 which has a duct 32 coaxially aligned but spaced from the outlet duct 28 to form therewith a through passageway. The cap portion 30 projects into the hollow bore 26 at 34 and together with the body portion 24 defines an annular chamber 36 surrounding the through passageway. The projection 34 is closely spaced to the converging lower end of the bore 26 to provide an annular passageway 38 communicating between the chamber 36 and the through passageway formed by ducts 28 and 32. The annular passageway 38 is directed toward the outlet end of the impeller unit 22 for a reason to be explained. Connected with the first impeller unit 22 is an air conduit 40 which is in direct communication with the chamber 36 so as to introduce air under pressure thereinto. Such air can then flow at high velocity through the annular passageway 38 into the through passageway toward the outlet end of the first impeller unit 22.

The remaining impeller units 22 are similarly connected to the air conduit 40, and all of these impeller units 22 are suitably supported, such as by the bracket 42 in spaced relation so as to provide air escape gaps at 44 and 46, and also at 48 between the last impeller unit 22 and the annular ring 50 connected to the inlet end of the tube 20. Air gaps are necessary between impeller units to prevent a reversal in direction of flow of air in the passageways which would occur in the absence of such air gaps because of excessive air pressures created on the downstream end of the air propelling device 16 relative to the upstream end thereof. These air gaps normally are arranged to become progressively smaller with the first air gap 44 being largest and air gap 48 being smallest. This progressive arrangement is desirable, because the air pressure in the through passageways progressively increases at the discharge end of each impeller unit 22 relative to the external air pressure, and since it is desirable to eliminate the same amount of air at the gaps, they necessarily must diminish progressively in effective cross sections. Also, for the purpose of preventing snagging of the coil springs at these air gaps, the passageway edges below the air gaps may be chamfered.

The flexible plastic tube 20 is attached at its inlet end to the annular ring 50 and has a construction at its outlet end permitting passage of air therefrom while preventing passage of the coil springs 20. For this purpose a single strand of wire 52 is stretched across and is attached to the sleeve 54. A brass compression ferrule 56 and a standard ferrule nut 58, which is threadedly connected to sleeve 54, cooperate in securing the sleeve 54 on the outlet end of the tube 20.

The operation of loading the coil springs 12 into the tube 20 is a relatively simple one. The air propelling device 16 is connected to the discharge duct 14 from the spring forming or dispensing machine 10 and air is introduced through the air conduit at about eighty pounds per square inch pressure. This creates a venturi effect in each of the impeller units 22 and causes high suction effect in duct 14 and a rapid flow of air from the duct 14 through the tube 20. Each of the impeller units 22 accelerates the passage of coil springs 12 therethrough so that the first of the coil springs 12 will travel to the outlet end of tube 20 and each of the succeeding springs will align itself in abutting relation with the spring immediately preceding it. As soon as the tube, which may be about twenty five feet long, is filled, the loading operation will be stopped and the inlet end of the tube 20 can be suitably closed.

The tube 20 normally is rolled into a coil when being filled, and it may now be stored in this shape until there is a demand for the coil springs 12, or it can be transported to a desired unloading destination.

Reference is now made to FIGURES 2 and 3 which show apparatus for discharging the coil springs 12 singly from the tube 20 and propelling them into products requiring the use of such coil springs. The one end of the tube 20 may be inserted into a source 60 of air at about twenty pounds per square inch, and the other end of the tube 20 is connected to the metering device 62 for metering one coil spring at a time through the axial passageway 64 without interrupting continuous passage of the air. For this purpose a bar 66 may be pivotally supported, and a pair of needles 68 and 70 are connected thereto for movement to and from said passageway 64 respectively on oscillating movement of said bar 66. The needles 68 and 70 are spaced sufficiently far apart so that the desired number of coil springs 12 can pass therethrough per cycle of movement of the bar 66. Normally, only one spring will pass per cycle.

Positioned in axial alignment with the metering device 62 is an impeller unit 72 which is constructed generally the same as the impeller units 22, previously described, and therefore, the impeller unit 72 will not be described in detail. As shown, air under pressure is introduced into the impeller unit 72 by the conduit 74 from a source of high pressure air.

Connected to the outlet of the loading or impeller unit 72 is a stainless steel tubing 76 which has its outlet positioned over a lock member 78. The latter is supported at a station 80 for holding this or similar products which require such coil springs 12.

If desired, a group of such loading arrangements, as shown in FIGURE 2, may be positioned in parallel so that a number of coil springs 12 can be introduced simultaneously into separate chambers of the lock member or product 78. For this purpose a fixture 80, FIGURE 3, may be used to support the group of parallel metering devices 62 and impeller or loading units 72.

The operation of this portion of the invention is also relatively simple. The product or lock member 78 is positioned at the station 80. The tube 20, filled with coil springs 12, is connected to the inlet end of the metering device 62, and preferably, the other end is connected to a source 60 of air at about twenty pounds per square inch pressure. The air is introduced through the conduit 74 at about eighty pounds per square inch pressure and may be allowed to flow continuously, or it may be controlled so that it flows only when the metering device 62 discharges a coil spring 12. The metering device 62 is then started by pivoting the bar 66 counterclockwise until needle 68 is withdrawn from the passageway 64 and needle 70 forms an obstruction therein. This allows one coil spring 12 to drop to the needle 70. The bar 66 is then pivoted clockwise until the needles 68 and 70 have returned to the illustrated position. This allows the one coil spring 12 to pass to the impeller unit 72 which propels the one coil spring 12 to the intended reception chamber in the product 78 via the stainless steel tube 76.

While the invention has been described as having a plastic tube loading apparatus and an apparatus for metering and feeding coil springs from the plastic tube, it will be understood that a method of operation can be carried out which is continuous from the loading to the unloading of the plastic tube merely by the introduction of a transfer step of the filled tube between these two operations.

Having thus described my invention, I claim:

1. Apparatus for feeding in sequence a series of axially aligned coil springs into a plurality of products having chambers therein for receiving such springs, comprising a relatively long flexible tube open at its inlet and outlet ends so as to be adapted for passage of air under pressure therethrough, said tube being adapted to be wound in a coil and having an internal transverse cross section slightly larger than the external diameter of said springs and having a relatively long length so as to accommodate therein said series of springs in end-to-end relationship; a metering device having a passageway to which the outlet of said tube is connected and having means in said passageway for metering said coil springs therethrough without interrupting continuous passage of air; an impeller unit positioned adjacent the discharge outlet of said metering device and including a through passageway aligned with said discharge outlet and means therein for accelerating passage of each metered spring therethrough; and conduit means defining an uninterrupted flow passageway communicating with the discharge outlet of said through passageway for guiding the accelerated springs to the chambers of said products.

2. Apparatus for feeding in sequence a series of axially aligned coil springs into a plurality of products having chambers therein for receiving such springs, comprising a relatively long flexible tube open at its inlet and outlet ends so as to be adapted for passage of air under pressure therethrough, said tube being flexible so as to be adapted to be wound in a coil shape and having an internal transverse cross section larger than the external diameter of said springs and having a relatively long length so as to accommodate therein said series of springs in abutting end-to-end relationship; a metering device having a passageway to which the outlet end of said tube is connected and having means in said passageway for metering said coil springs therethrough without interrupting continuous passage of air; an impeller unit positioned adjacent the discharge outlet of said metering device and including a through passageway having an inlet end aligned with said discharge outlet, means forming an annular air chamber encircling said through passageway, air inlet means communicating with said chamber for introducing air under pressure into said air chamber, and an annular passageway providing communication between said chamber and said through passageway and directed so as to discharge air at relatively high velocity from said chamber toward the outlet end of said through passageway; and conduit means defining an uninterrupted flow passageway communicating with the discharge outlet of said through passageway for guiding the accelerated springs to the chambers of said products.

References Cited by the Examiner

UNITED STATES PATENTS

| | | | |
|---|---|---|---|
| 669,892 | 3/01 | Bogardus | 243—27 |
| 700,607 | 5/02 | Batcheller | 243—27 |
| 1,943,451 | 1/34 | Needham | 243—25 |
| 2,355,311 | 8/44 | Linkner | 221—278 X |
| 2,366,448 | 1/45 | Greene et al. | 221—297 X |
| 2,493,868 | 1/50 | Griffin | 221—278 X |
| 2,534,140 | 12/50 | Moore | 221—278 X |
| 2,734,657 | 2/56 | Drese | 221—278 X |
| 2,738,899 | 3/56 | Hansen et al. | 221—278 X |
| 2,906,011 | 9/59 | Focht | 29—211 X |
| 3,039,531 | 6/62 | Scott | 221—278 X |

FOREIGN PATENTS

| | | |
|---|---|---|
| 836,758 | 10/38 | France. |
| 686,750 | 1/40 | Germany. |

RAPHAEL M. LUPO, *Primary Examiner.*

KENNETH N. LEIMER, LOUIS J. DEMBO, *Examiners.*